(12) United States Patent
Zhang et al.

(10) Patent No.: US 12,455,581 B2
(45) Date of Patent: Oct. 28, 2025

(54) GAS NEGATIVE PRESSURE VALVE

(71) Applicant: NINGBO WANAN CO., LTD., Zhejiang (CN)

(72) Inventors: Feng Zhang, Zhejiang (CN); Yunnan Wei, Zhejiang (CN); Jinghui Fan, Zhejiang (CN); Hongbin Ren, Zhejiang (CN)

(73) Assignee: NINGBO WANAN CO., LTD., Ningbo (CN)

( * ) Notice: Subject to any disclaimer, the term of this patent is extended or adjusted under 35 U.S.C. 154(b) by 87 days.

(21) Appl. No.: 18/498,998

(22) Filed: Oct. 31, 2023

(65) Prior Publication Data

US 2024/0419196 A1     Dec. 19, 2024

(30) Foreign Application Priority Data

Jun. 15, 2023  (CN) .......................... 202321528295.0

(51) Int. Cl.
| | |
|---|---|
| *G05D 16/06* | (2006.01) |
| *A62B 9/02* | (2006.01) |
| *B63C 11/22* | (2006.01) |
| *F16K 17/30* | (2006.01) |

(52) U.S. Cl.
CPC ........... *G05D 16/063* (2013.01); *F16K 17/30* (2013.01); *A62B 9/025* (2013.01); *B63C 11/2227* (2013.01); *Y10S 137/908* (2013.01); *Y10T 137/7836* (2015.04)

(58) Field of Classification Search
CPC ...... A62B 9/022; A62B 9/025; B63C 11/2227; Y10S 137/908; Y10T 137/7836
USPC ..................................................... 128/204.26
See application file for complete search history.

(56) References Cited

U.S. PATENT DOCUMENTS

| | | | | |
|---|---|---|---|---|
| 3,040,762 A | * | 6/1962 | Spiotta ................... | A62B 9/022 137/854 |
| 2012/0260919 A1 | * | 10/2012 | Townsend ................ | A62B 7/10 128/205.24 |
| 2024/0208623 A1 | * | 6/2024 | Wrigley .................. | B63C 11/14 |

* cited by examiner

Primary Examiner — Robert K Arundale
(74) Attorney, Agent, or Firm — Getech Law LLC; Jun Ye

(57) ABSTRACT

A gas negative pressure valve is provided which comprises a valve body and a valve cover. A gas inlet and a gas outlet are disposed on the valve body. A drive lever and a diaphragm assembly are disposed inside the valve body, and one end of the drive lever is connected to a lower end of the diaphragm assembly, and the other end of the drive lever is connected with a sealing gasket. An end of the drive lever is hinged on a sidewall of the valve body. A reset spring is disposed between the drive lever and a bottom of an inner chamber of the valve body. A guide passage is opened in the inner chamber of the valve body. An end of the drive lever close to the gas inlet is connected with a guide shaft, a lower end of which is cooperated slidably in the guide passage.

11 Claims, 7 Drawing Sheets

GAS NEGATIVE PRESSURE VALVE

This application is based upon and claims priority to Chinese Patent Application No. 202321528295.0, filed on Jun. 15, 2023, the entire contents of which are incorporated herein by reference.

TECHNICAL FIELD

The present disclosure relates to the field of gas valve technologies, and in particular to a gas negative pressure valve.

BACKGROUND

Pressure-reducing valve is a device capable of automatically reducing a working pressure of a pipe to achieve the function of reducing a high pressure of a medium to a specified pressure after being given a pressure reduction range. At present, most of the pressure-reducing valves are pressure-reducing valves with constant pressure, namely, they are normally-open pressure-reducing valves with an output pressure staying within a constant range.

In recent years, those products such as power generator units which generate power by using gas as a fuel on the market adopt a structure of piston engine, and therefore, it is required to dispose a negative pressure valve between the gas pressure-reducing valve and the piston engine, for controlling gas to be supplied or closed at the time of negative pressure. The pressure-reducing valves with constant pressure are not applicable to such gas devices as gas engine because a gas pressure and a gas volume desired by the engine in operation are not constant but should be regulated in real time based on actual situations so as to match the output gas pressure and gas volume with those required by the engine.

In the structure of the existing negative pressure valves, as shown in the patent CN214368018U, a corresponding valve seat is disposed at a position corresponding to an inner end of a gas inlet passage in a valve body, and the valve seat is usually connected with the valve body by thread cooperation. Usually, there is a risk of un-flatness and inclination during the valve seat mounting process. On the other hand, a sealing gasket and a lever are relatively fixed, namely, under the action of the lever, the sealing gasket rotates to a position cooperating with the valve seat, disabling swing adjustment. Hence, when an upper end surface of the valve seat is not mounted flat, there may be a defect of incomplete sealing occurring to the gas inlet position.

SUMMARY

The object of the present disclosure is to overcome at least one defect in the prior arts and provide a gas negative pressure valve to ensure up and down movement stability of the valve body and improve the sealing performance of the valve upon closing.

In order to address the above problems, the present disclosure provides a gas negative pressure valve, which comprises a valve body and a valve cover. A gas inlet and a gas outlet are disposed on the valve body. Further, a gas inlet joint is connected in the gas inlet. A drive lever is disposed inside the valve body, and a diaphragm assembly is disposed between the valve body and the valve cover and above the drive lever. One end of the drive lever is connected to a lower end of the diaphragm assembly, and the other end of the drive lever is connected with a sealing gasket for blocking an inner end of the gas inlet joint. An end of the drive lever close to the sealing gasket is hinged on a sidewall of the valve body. Further, a reset spring is disposed between the drive lever and a bottom of an inner chamber of the valve body. A guide passage in communication with the gas inlet is opened in the inner chamber of the valve body. An end of the drive lever close to the gas inlet is connected with a guide shaft, a lower end of which is cooperated slidably in the guide passage. Further, relative swing can be carried out between the guide shaft and the drive lever along a length direction of the drive lever. In addition, a gas-through passage is reserved between an outer wall of the guide shaft and an inner wall of the guide passage and the sealing gasket is detachably connected to a lower end of the guide shaft.

Compared with the prior arts, the present disclosure has the following beneficial effects.

In the gas negative pressure valve structure of the present disclosure, a guide passage in communication with an inlet gas passage is disposed in the inner chamber of the valve body, and a guide shaft slidably cooperating in the guide passage is connected to an end of the drive lever, and the lower end of the guide shaft is provided with a corresponding sealing gasket for blocking the inner end of the gas inlet joint connected in the gas inlet; in this structure, due to presence of the guide passage, regardless of whether the drive lever has design error during rotation, it can be ensured that the sealing gasket is pressed to the upper end of the gas inlet joint along the direction of the guide passage; further, in this structure, relative swing can be carried out between the guide shaft and the drive lever along a length direction of the drive lever, namely, when the drive lever drives the guide shaft to slide along the guide passage, seizure does not tend to occur and the guide shaft can adaptively swing. Thus, when the upper end surface of the gas inlet joint is not mounted flat, adjustment can be made to the angle of the sealing gasket by swing of the guide shaft. In this way, it can be better guaranteed that the sealing gasket at the lower end of the guide shaft can sealingly cooperate with the gas inlet joint to avoid gas leakage.

As an improvement, a plurality of protrusion ribs distributed circumferentially and extending axially are disposed on an inner wall of the guide passage, and an inner sidewall of each protrusion rib is in slide cooperation with an outer wall of the guide shaft. A communication hole penetrating through radially and extending axially is opened on the guide shaft. In the above improved structure, the disposal of a plurality of protrusion ribs reduces a contact area of the guide shaft during vertical slide as well as a frictional resistance. Further, a gas-through passage is better formed between the outer wall of the guide shaft and the inner wall of the guide passage. In addition, with the disposal of the communication hole, when the valve port is opened, the gas from the gas inlet can more quickly and uniformly enter the gas-through passage, ensuring stable gas output of the gas outlet.

As a further improvement, a mounting shaft extending along a width direction of the drive lever is disposed at an end of the drive lever close to the gas inlet, a mounting block is disposed at an upper end of the guide shaft, and a horizontally-opening mounting fitting groove is disposed on a sidewall of the mounting block. The mounting shaft is fitted into the mounting fitting groove. In the above improved structure, the guide shaft and the drive lever are connected by fitting the mounting shaft into the mounting fitting groove, and the guide shaft can swing around the mounting shaft after connection, so as to better ensure the lower end surface of the sealing gasket can be sealingly attached to the upper end surface of the gas inlet joint.

As a further improvement, a rectangular mounting through hole is disposed at an end of the drive lever close to the gas inlet. A V-shaped support plate is disposed respectively at both sides corresponding to the width direction of the drive lever in the mounting hole. A mounting channel is formed respectively between the two V-shaped support plates and a lower end surface of the drive lever. Both ends of the mounting shaft are movably inserted into the two mounting channels. A limiting baffle plate for axially limiting the mounting shaft is disposed respectively at both sides of the width direction of the drive lever. In the above improved structure, the mounting shaft and the drive lever are of a split structure and connected together by assembling in later stage. Further, after being assembled, there is a movement space between the mounting shaft and the drive lever, which facilitates swing between the guide shaft and the drive lever. Thus, it is guaranteed that the slide of the guide shaft in the guide passage is not affected by the drive lever, thus further improving the cooperative sealing between the sealing gasket and the upper end of the gas inlet joint.

As a further improvement, upward-opening assembling grooves are symmetrically disposed on the inner wall of the valve body. Connection shafts rotatably cooperated in the two respective assembling grooves are disposed on the drive lever. A limiting piece for preventing the connection shaft from separating from the assembling groove is disposed respectively at the positions corresponding to the two assembling grooves in the valve body. In the above improved structure, with the upward-opening assembling grooves, the connection shafts at both sides of the drive lever can be placed vertically into the assembling grooves during mounting process, and then their tops are limited by the limiting pieces, resulting in simple structure and easy mounting.

As a further improvement, a downward-bending connection lug plate is disposed respectively at both sides of the width direction of the drive lever, and a hinging shaft parallel to the mounting shaft is inserted between the two connection lug plates. Further, both ends of the hinging shaft penetrate through the two connection lug plates to form the two connection shafts.

As a further improvement, a linkage rod perpendicular to the diaphragm assembly is formed in the middle of the diaphragm assembly. A lower end of the linkage rod is detachably connected to an end of the drive lever away from the guide shaft. In the above improved structure, the linkage rod and the diaphragm assembly are fixedly connected by integral formation, facilitating processing, and stable and reliable connection.

As a further improvement, the drive lever is a horizontal plate-like structure and an opening groove is disposed at an end of the drive lever away from the guide shaft. A positioning groove horizontally fitted into the opening groove is disposed on an outer wall of the lower end of the linkage rod. In the above improved structure, the plate-like drive lever can facilitate processing and production. In addition, through one opening groove, the drive lever and the lower end of the linkage rod can be quickly assembled by insertion, simplifying the connection structure.

As a further improvement, the diaphragm assembly comprises a circular support plate and an annular elastic diaphragm is formed along a periphery of the support plate. The support plate is of a hard rubber material and the elastic diaphragm is of a soft rubber material. The linkage rod is formed on a lower end surface of the support plate. In the above improved structure, the support plate of hard rubber material can have a stable support force to better drive the drive lever to rotate; the diaphragm of soft rubber material can have a more stable elastic deformation force.

As a further improvement, a plate-like first metal embedding piece is disposed in the support plate, and a column-like second metal embedding piece is disposed in the linkage rod. Further, the first metal embedding piece and the second metal embedding piece are of one-piece structure. In the above improved structure, the integrated first metal embedding piece and second metal embedding piece can, after being disposed, further increase a connection strength between the linkage rod and the support plate.

Figure 1:
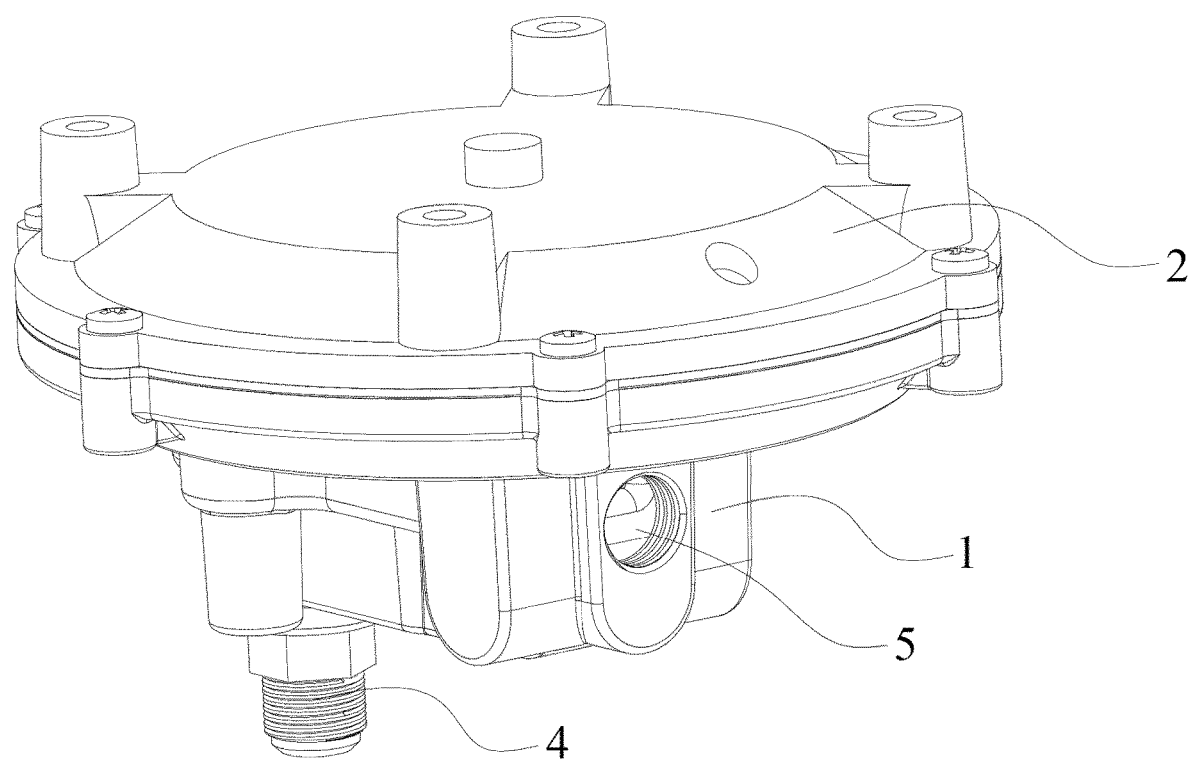
FIG. 1 is a schematic diagram illustrating a stereoscopic structure of a gas negative pressure valve according to an embodiment of the present disclosure.

Numerals of the drawings are described below:
1. valve body, 2. valve cover, 3. gas outlet, 4. gas inlet joint, 5. drive lever, 6. sealing gasket, 7. reset spring, 8. guide passage, 9. guide shaft, 10. protrusion rib, 11. communication hole, 12. assembling groove, 13. connection shaft, 14. limiting piece, 15. linkage rod, 16. opening groove, 17. positioning groove, 18. support plate, 19. elastic diaphragm, 20. first metal embedding piece, 21. second metal embedding piece, 22. mounting shaft, 23. mounting block, 24. mounting fitting groove, 25. mounting through hole, 26. V-shaped support plate, 27. mounting channel, 28. limiting baffle plate, 29. connection lug plate, 30. hinging shaft, 31. first positioning boss, and 32. second positioning boss.

DETAILED DESCRIPTIONS OF EMBODIMENTS

In order to more clearly and fully describe the objects, the technical solutions and the advantages of the embodiments of the present disclosure, further descriptions are made to the present disclosure in combination with the accompanying drawings.

It is to be noted that in order to avoid obscuring the present disclosure for unnecessary details, only those structures and/or processing steps closely related to the technical solutions of the present disclosure are illustrated in the drawings while other details not closely related to the present disclosure are omitted.

It should be emphasized that the terms "include/comprise/have" used herein refer to presence of features, elements, steps or components but dot not preclude presence or addition of one or more other features, elements, steps or components. In the descriptions of the present disclosure, it should be understood that the orientations or positional relationships indicated by the terms "above", "lower end", "inner end", "inner wall", "outer wall", "upper", "peripheral" etc. are based on the orientations or positional relationships shown in the drawings and used only to help descriptions of the present disclosure and make simplified descriptions, and thus the actual directions or relative positions of the components can be changed accordingly depending on the position of the observer.

As shown in FIGS. 1 to 7, the present disclosure provides a gas negative pressure valve, comprising a valve body 1 and a valve cover 2. A vertical gas inlet and a horizontal gas outlet 3 are disposed on the valve body 1. Further, a gas inlet joint 4 is connected in the gas inlet. Specifically, an end of the gas inlet joint 4 is connected in the gas inlet through thread cooperation and an upper end portion of the gas inlet joint 4 extending into the valve body 1 forms a sealing valve seat. A drive lever 5 is disposed inside the valve body 1, and a diaphragm assembly is disposed between the valve body 1 and the valve cover 2 and above the drive lever 5. One end of the drive lever 5 is connected to a lower end of the diaphragm assembly, and the other end of the drive lever 5 is connected with a sealing gasket 6 for blocking an inner end (upper end) of the gas inlet joint 4. An end of the drive lever 5 close to the sealing gasket 6 is hinged on a sidewall of the valve body 1. Further, a reset spring 7 is disposed between the drive lever 5 and a bottom of an inner chamber of the valve body 1. A guide passage 8 in communication with the gas inlet is opened in the inner chamber of the valve body 1. An end of the drive lever 5 close to the gas inlet is connected with a guide shaft 9, a lower end of which is cooperated slidably in the guide passage 8. Further, relative swing can be carried out between the guide shaft 9 and the drive lever 5 along a length direction of the drive lever 5. In addition, a gas-through passage is reserved between an outer wall of the guide shaft 9 and an inner wall of the guide passage 8 and the sealing gasket 6 is detachably connected to a lower end of the guide shaft 9.

The working principle is as follows: when a negative pressure gas suction state is generated at the outlet side of the valve body 1, the diaphragm assembly in the valve body 1 deforms toward the reset spring 7 under the action of the negative pressure; when the negative pressure overcomes a spring force of the reset spring 7, the sealing gasket 6, under the action of the drive lever 5, is separated from the upper end of the gas inlet joint 4, and a valve port is opened to output gas. When no negative pressure state is generated at the outlet side of the valve body 1, the drive lever 5, under the action of the spring force of the reset spring 7, keeps the valve port closed to prevent gas passing through. By the reciprocal opening and closing operations, the use requirements of the piston engine can be satisfied.

Figure 4:
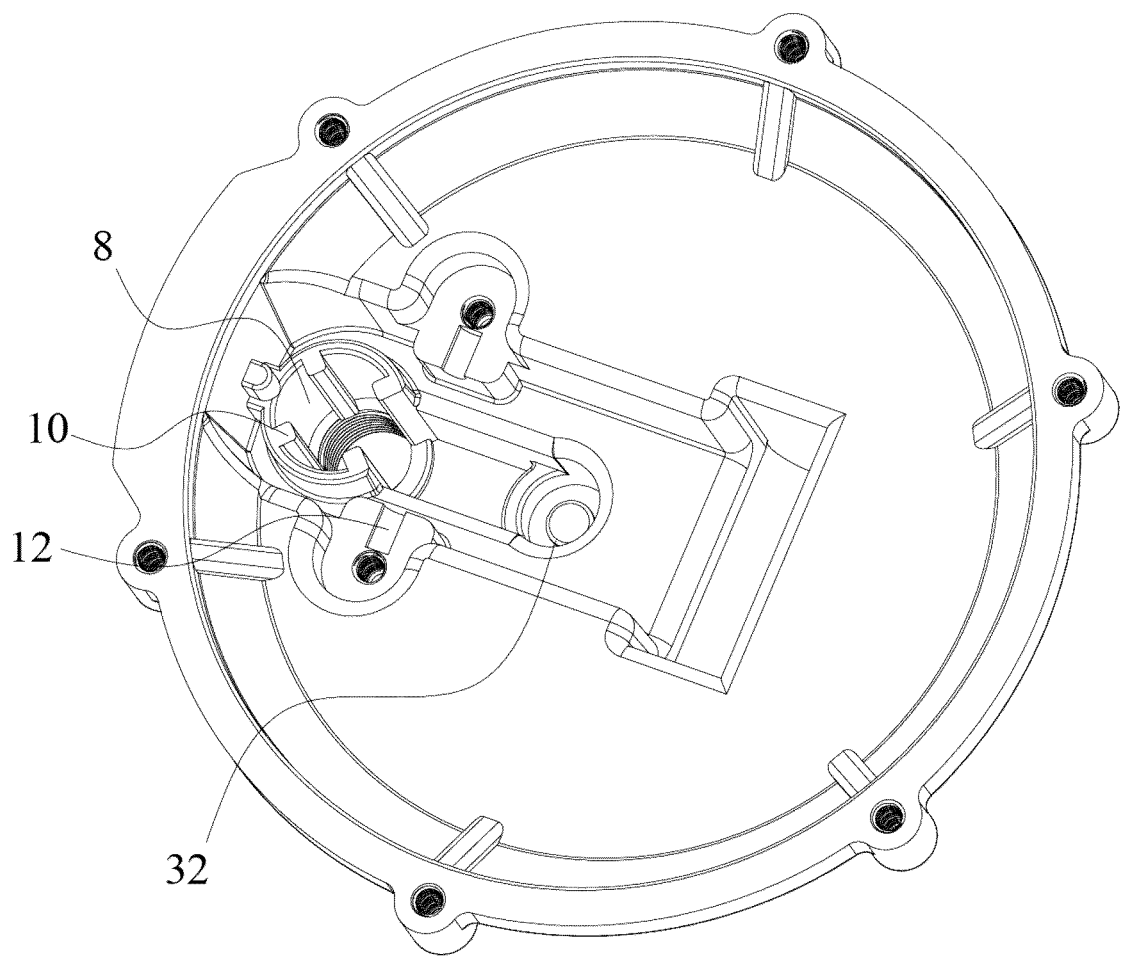
FIG. 4 is a structural schematic diagram illustrating a valve body according to an embodiment of the present disclosure.

As shown in FIG. 4, in this embodiment, a plurality of protrusion ribs 10 distributed circumferentially and extending axially are disposed on an inner wall of the guide passage 8, and an inner sidewall of each protrusion rib 10 is in slide cooperation with the outer wall of the guide shaft 9. Preferably, four protrusion ribs 10 are uniformly disposed on the inner wall of the guide passage 8. The inner sidewalls of the four protrusion ribs 10 are shaped like arc such that a contour formed by the four arc-shaped inner sidewalls is a circle for the outer wall of the guide shaft 9 to slidably cooperate with. When the guide shaft 9 is slidably cooperated in the guide passage 8, under the action of the four protrusion ribs 10, a corresponding gas-through passage is formed between the outer wall of the guide shaft 9 and the inner wall of the guide passage 8 to ensure the valve port in an opened state allows the gas from the gas inlet to smoothly run through the gas-through passage into the inner chamber of the valve body 1 and then out of the gas outlet 3.

Figure 6:
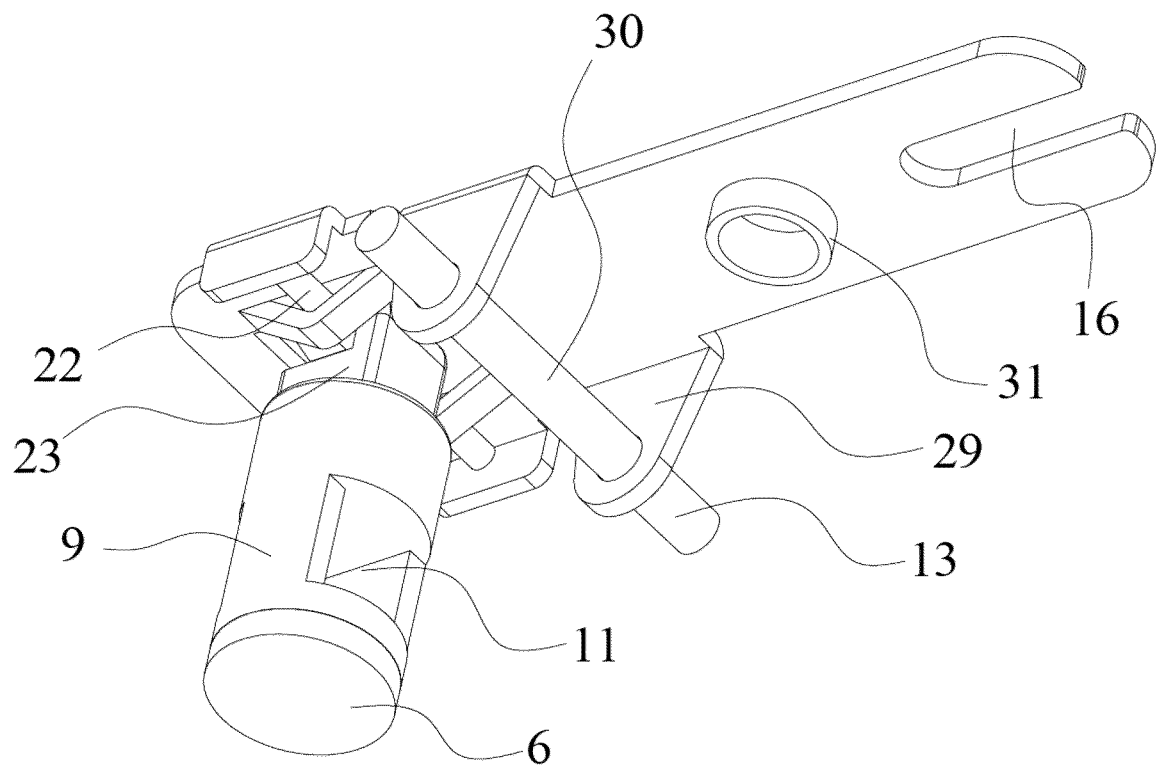
FIG. 6 is a schematic diagram illustrating connection structure of a drive lever and a guide shaft from another angle according to an embodiment of the present disclosure.

With reference to FIG. 6, a communication hole 11 penetrating through radially and extending axially is opened on the guide shaft 9. With disposal of the communication hole 11, when the valve port is opened, the gas from the gas inlet can more quickly and uniformly enter the gas-through passage, ensuring stable gas output from the gas outlet 3.

Figure 3:
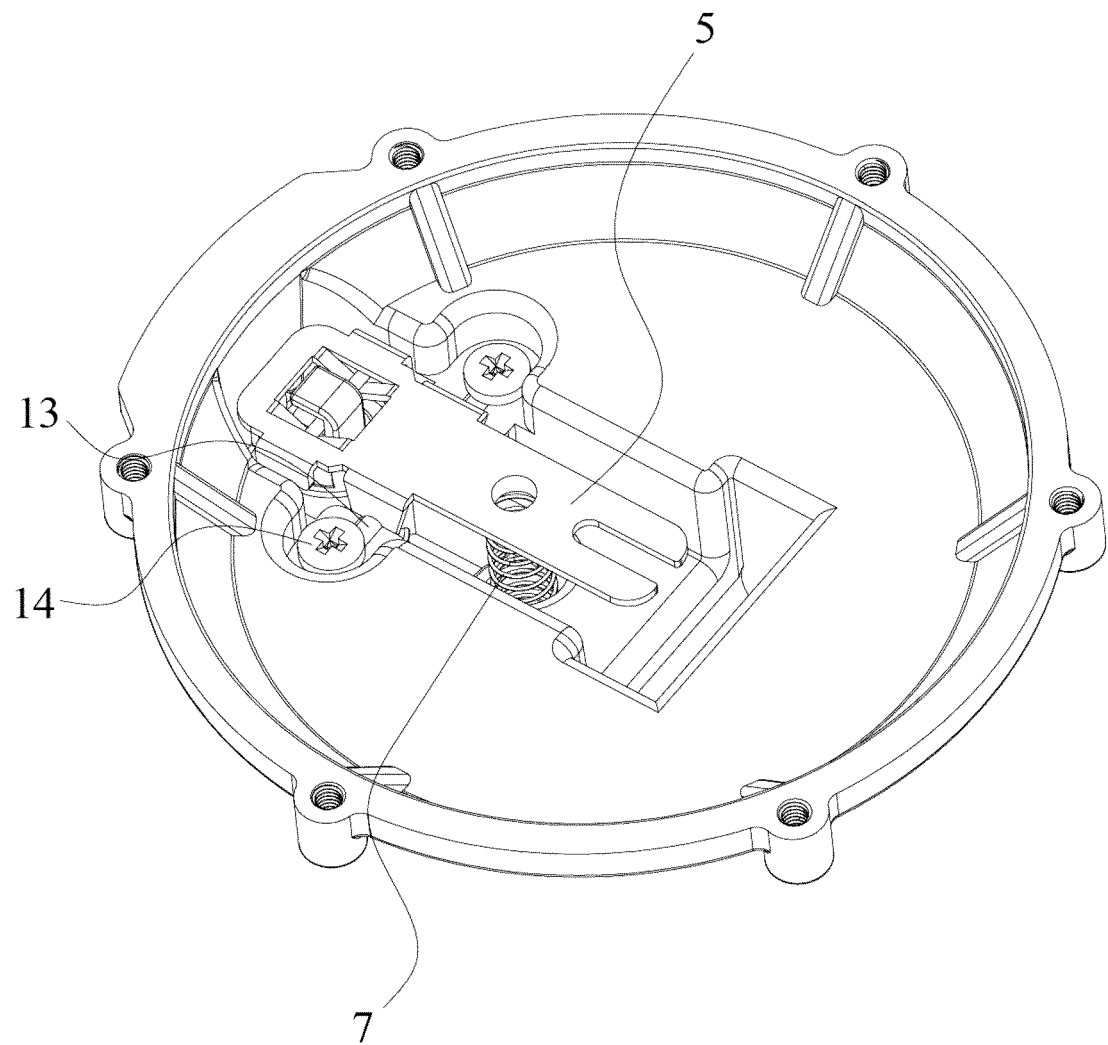
FIG. 3 is a structural schematic diagram of a gas negative pressure valve without a valve cover according to an embodiment of the present disclosure.

With reference to FIGS. 3 and 4, an avoiding passage for the drive lever 5 to move up and down is disposed in the inner chamber of the valve body 1. Further, upward-opening assembling grooves 12 are symmetrically disposed at both sides of the avoiding passage on the inner wall of the valve body 1. Connection shafts 13 rotatably cooperated in the two respective assembling grooves 12 are disposed on the drive lever 5. A limiting piece 14 for preventing the connection shaft 13 from separating from the assembling groove 12 is disposed respectively at the positions corresponding to the two assembling grooves 12 in the valve body 1. More specifically, the cross section of the assembling grooves 12 is a U-structure. A sunken mounting groove is disposed respectively at both sides of the inner wall of the valve body 1, and a corresponding assembling groove 12 is disposed on the bottom of each mounting groove. The drive lever 5 is rotatably cooperated in the assembling grooves 12 through two connection shafts 13. Furthermore, in this structure, thumb screws may be directly selected as the limiting pieces 4. When two connection shafts 13 of the drive lever 5 are assembled into the corresponding assembling grooves 12, a thumb screw is mounted respectively into the two mounting grooves, while the head skirts of the thumb screws are pressed and limited above the corresponding connection shafts 13. In this way, it is ensured that the connection shafts 13 are prevented from separating from the assembling grooves 12 during rotation, and thus the drive lever 5 can rotate flexibly and stably.

Figure 2:
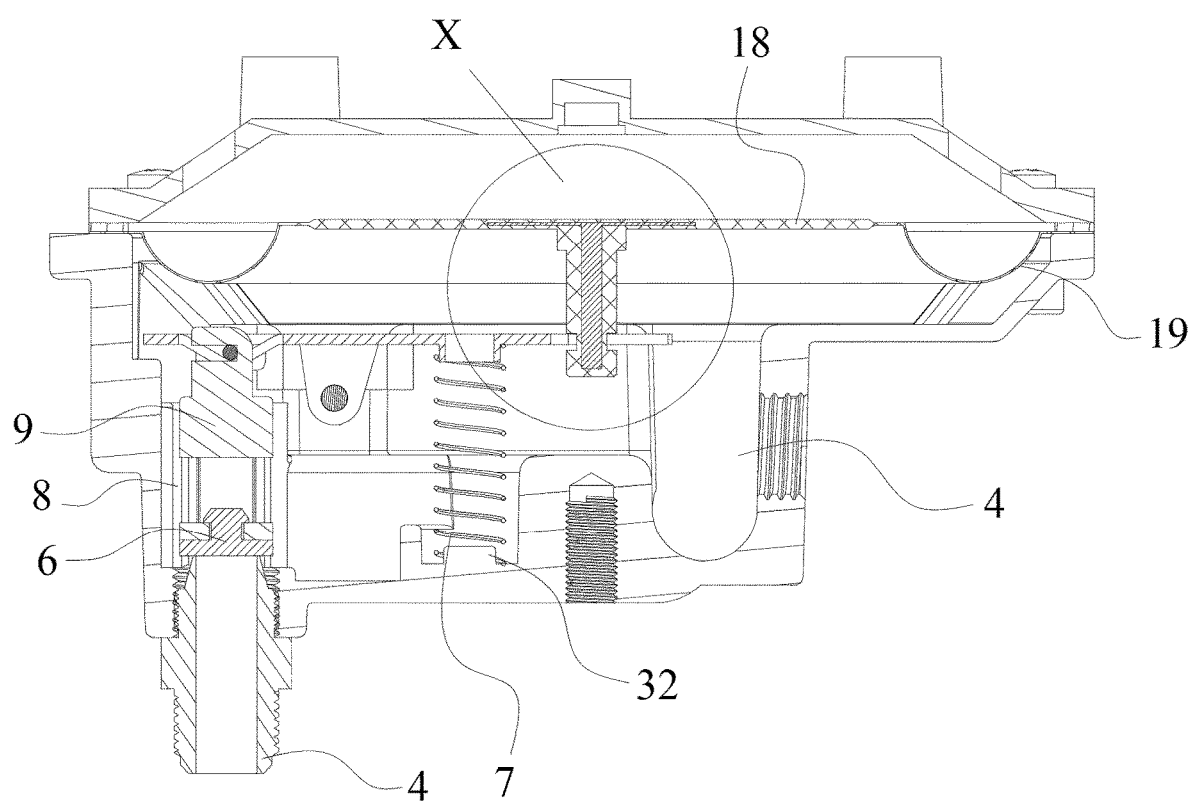
FIG. 2 is a schematic diagram illustrating a sectional structure of a gas negative pressure valve according to an embodiment of the present disclosure.

With reference to FIG. 2, in this embodiment, a linkage rod perpendicular to the diaphragm assembly is formed in the middle of the diaphragm assembly. A lower end of the linkage rod 15 is detachably connected to an end of the drive lever 5 away from the guide shaft 9. Through up and down deformation movement of the diaphragm assembly, the drive lever 5 is driven to rotate around the corresponding rotary shaft. Specifically, the drive lever 5 is a horizontal plate-like structure and an opening groove 16 is disposed at an end of the drive lever 5 away from the guide shaft 9. A positioning groove 17 horizontally fitted into the opening groove 16 is disposed on an outer wall of the lower end of the linkage rod 15. During mounting process, the positioning groove 17 at the lower end of the linkage rod 15 can be directly and horizontally fitted into the opening groove 16, bringing much convenience.

More specifically, the diaphragm assembly in the above structure comprises a circular support plate 18 and an elastic diaphragm 19 which is annular and downward convex is formed along a periphery of the support plate 18. In this structure, since the support plate 18 is partially connected to the drive lever 5, it needs to have a structural strength. Thus, the support plate 18 is of a hard rubber material. Furthermore, the elastic diaphragm 19 needs to provide an elastic deformation force, and thus, the elastic diaphragm 19 is of a soft rubber material. The linkage rod 15 is integrally formed on a lower end surface of the support plate 18.

Furthermore, in this structure, in order to further improve a connection strength between the linkage rod 15 and the support plate 18, a plate-like first metal embedding piece 20 is disposed in the support plate 18, and a column-like second metal embedding piece 21 is disposed in the linkage rod 15. Further, the first metal embedding piece 20 and the second metal embedding piece 21 are of one-piece structure.

Figure 5:
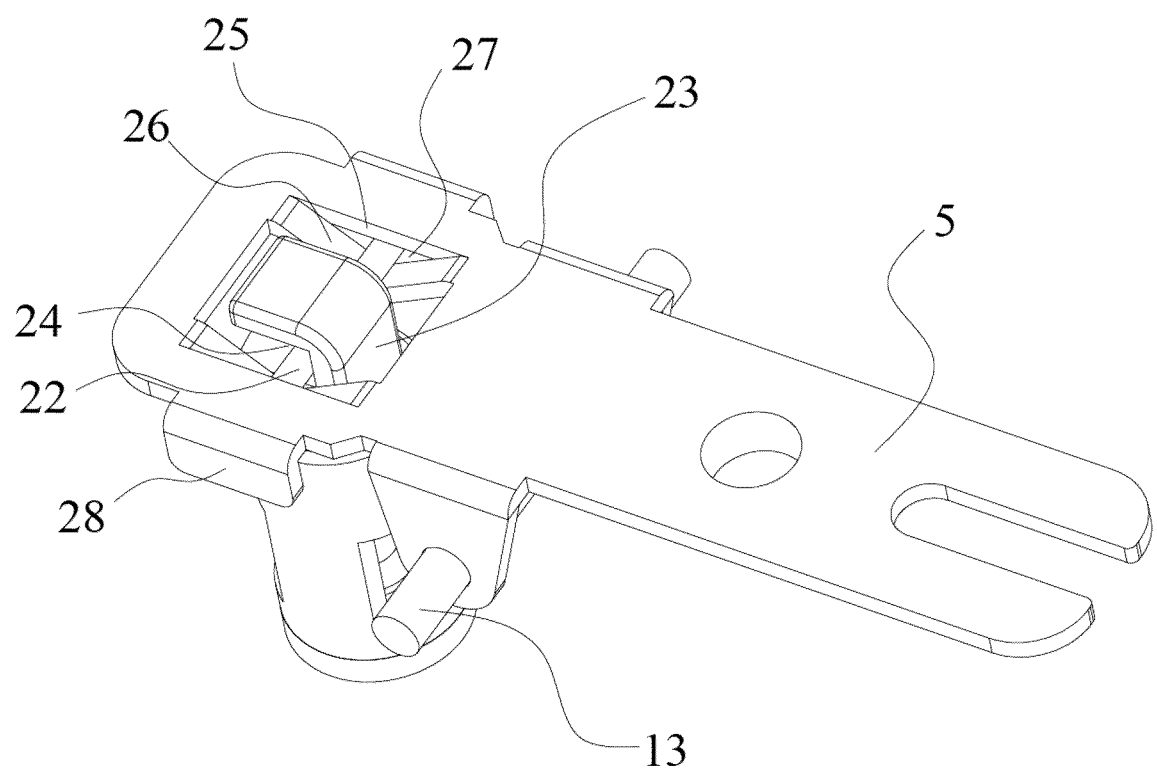
FIG. 5 is a schematic diagram illustrating connection structure of a drive lever and a guide shaft according to an embodiment of the present disclosure.
Figure 7:
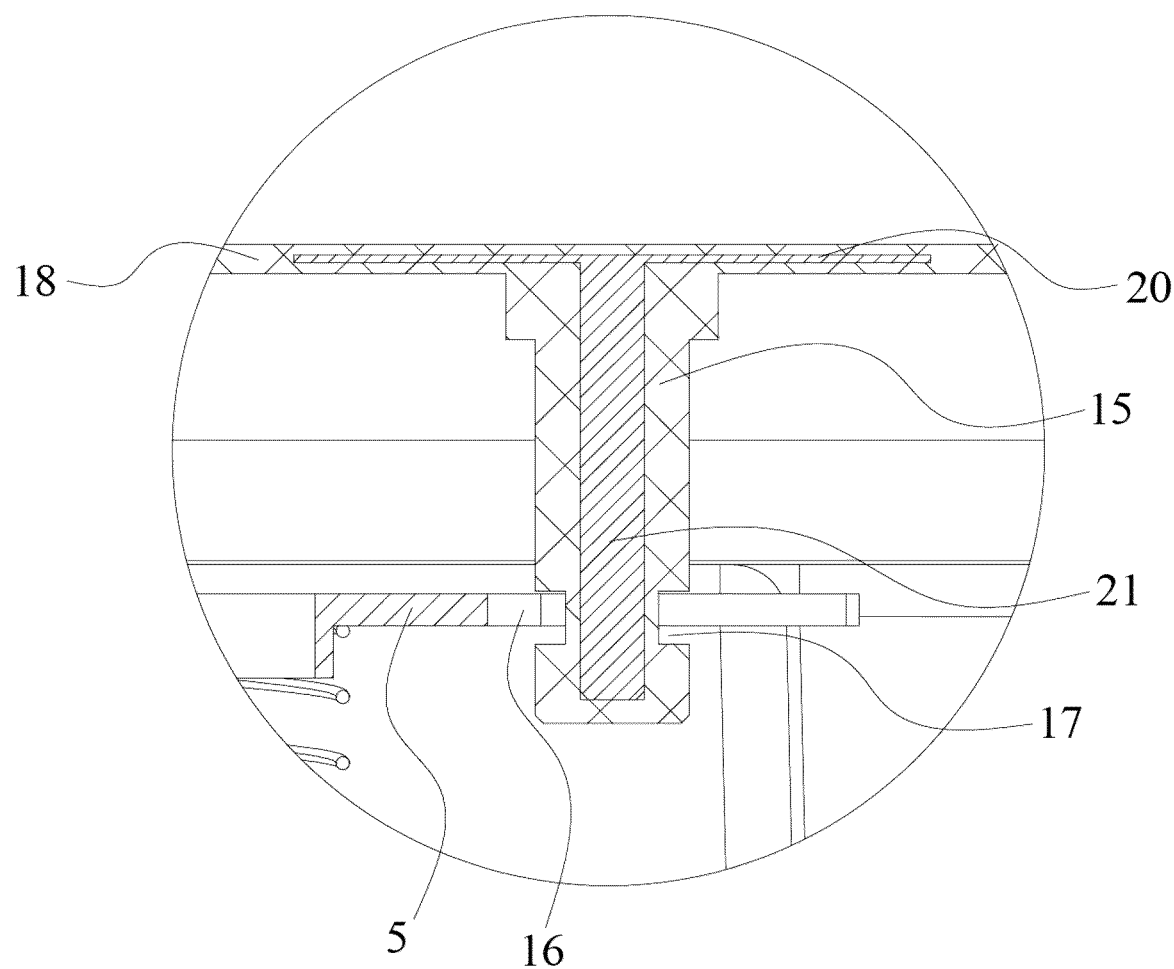
FIG. 7 is an enlarged view of the part X in FIG. 2.

As shown in FIGS. 5 to 7, a mounting shaft 22 extending along a width direction of the drive lever 5 is disposed at an end of the drive lever 5 close to the gas inlet, a mounting block 23 is disposed at an upper end of the guide shaft 9, and a horizontally-opening mounting fitting groove 24 is disposed on a sidewall of the mounting block 23. The mounting shaft 22 is fitted into the mounting fitting groove 24. A rectangular mounting through hole 25 is disposed at an end of the drive lever 5 close to the gas inlet. A V-shaped support plate 26 is disposed respectively at both sides corresponding to the width direction of the drive lever 5 in the mounting hole. A mounting channel 27 is formed respectively between the two V-shaped support plates 26 and a lower end surface of the drive lever 5. Both ends of the mounting shaft 22 are movably inserted into the two mounting channels 27. A limiting baffle plate 28 for axially limiting the mounting shaft 22 is disposed respectively at both sides of the width direction of the drive lever 5. The limiting baffle plates 28 herein are, in essence, two convex lugs formed at both sides of the width direction of the drive lever 5. When both ends of the mounting shaft 22 are respectively inserted into the corresponding mounting channels 27, the two convex lugs are bent down to form two limiting baffle plates 28 to achieve limiting effect on the two axial ends of the mounting shaft 22 and prevent the mounting shaft 22 from separating from the drive lever 5. Furthermore, when the guide shaft 9 is mounted, the mounting fitting groove 24 on its top can be fitted to the middle of the mounting shaft at an angle of inclination, and after that, the guide shaft 9 is rotated to be perpendicular to the drive lever 5.

On the other hand, as shown in FIG. 6, a downward-bending connection lug plate 29 is disposed respectively at both sides of the width direction of the drive lever 5, and a hinging shaft 30 parallel to the mounting shaft 22 is inserted between the two connection lug plates 29. Further, both ends of the hinging shaft 30 penetrate through the two connection lug plates 29 to form the two connection shafts 13. During mounting process, the two connection shafts 13 are rotatably cooperated respectively in the assembling grooves 12 at both sides of the avoiding passage on the inner wall of the valve body 1.

As shown in FIG. 2 and FIG. 6, a column-like first positioning boss 31 is further formed on a lower end surface of an approximate middle position of the drive lever 5. An upper end of the reset spring 7 is cooperatively sleeved on the first positioning boss 31. Furthermore, a corresponding spring hole is formed at the bottom of the inner chamber of the valve body 1, and an outward-convex second positioning boss 32 is formed at the bottom of the spring hole. A lower end of the reset spring 7 is cooperatively sleeved on the second positioning boss 32 to ensure the stability of the telescopic movement of the reset spring 7.

Although the present disclosure is described as above, the scope of protection of the present disclosure is not limited hereto. Various changes and modifications made by those skilled in the art without departing from the spirit and scope of protection of the present disclosure shall fall within the scope of protection of the present disclosure.

The invention claimed is:

1. A gas negative pressure valve, comprising a valve body (1) and a valve cover (2), wherein
    a gas inlet and a gas outlet (3) are disposed on the valve body (1), and a gas inlet joint (4) is connected in the gas inlet;
    a drive lever (5) is disposed inside the valve body (1), and a diaphragm assembly is disposed between the valve body (1) and the valve cover (2) and above the drive lever (5);
    a first end of the drive lever (5) is connected to a lower end of the diaphragm assembly, and a second end of the drive lever (5) is connected with a sealing gasket (6) for blocking an inner end of the gas inlet joint;
    the second end of the drive lever (5) is hinged on a sidewall of the valve body (1);
    a reset spring (7) is disposed between the drive lever (5) and a bottom of an inner chamber of the valve body (1), wherein
        the inner chamber of the valve body (1) has a guide passage (8) connected to the gas inlet;
    the second end of the drive lever (5) is connected with a guide shaft (9);
    a lower end of the guide shaft (9) is cooperated slidably in the guide passage (8);
    the guide shaft (9) and the drive lever (5) are configured to swing relative to each other along a longitudinal direction of the drive lever (5);
    a gas-through passage is between an outer wall of the guide shaft (9) and an inner wall of the guide passage (8);
    the sealing gasket (6) is detachably connected to the lower end of the guide shaft (9);
    a mounting shaft (22) is disposed at the second end of the drive lever (5);
    the mounting shaft (22) extends along a width direction of the second end of the drive lever (5);
    a mounting block (23) is disposed at an upper end of the guide shaft (9);
    a horizontally-opening mounting fitting groove (24) is disposed on a sidewall of the mounting block (23); and
    the mounting shaft (22) is fitted into the mounting fitting groove (24).

2. The gas negative pressure valve of claim 1, wherein
    a plurality of protrusion ribs (10) distributed circumferentially and extending axially are disposed on the inner wall of the guide passage (8);
    an inner sidewall of each protrusion rib (10), of the plurality of protrusion ribs, is in slide cooperation with the outer wall of the guide shaft (9); and
    a communication hole (11) penetrating through radially and extending axially is opened on the guide shaft (9).

3. The gas negative pressure valve of claim 1, wherein
    a rectangular mounting through hole (25) is disposed at the second end of the drive lever (5);
    a V-shaped support plate (26) is disposed respectively at both sides corresponding to the width direction of the drive lever (5) in the mounting through hole;
    a mounting channel (27) exists respectively between two V-shaped support plates (26) and a lower end surface of the drive lever (5);
    both ends of the mounting shaft (22) are movably inserted into two mounting channels (27); and
    a limiting baffle plate (28) for axially limiting the mounting shaft (22) is disposed respectively at both sides of the width direction of the drive lever (5).

4. The gas negative pressure valve of claim 1, wherein upward-opening assembling grooves (12) are symmetrically disposed on the inner wall of the valve body (1);

connection shafts (13) rotatably cooperated in two respective assembling grooves (12) are disposed on the drive lever (5); and a limiting piece (14) for preventing the connection shaft (13) from separating from the assembling groove (12) is disposed respectively at positions corresponding to the two assembling grooves (12) in the valve body (1).

5. The gas negative pressure valve of claim 4, wherein a downward-bending connection lug plate (29) is disposed respectively at both sides of the width direction of the drive lever (5);

a hinging shaft (30) parallel to the mounting shaft (22) is inserted between two connection lug plates (29); and both ends of the hinging shaft (30) penetrate through the two connection lug plates (29) to form two connection shafts (13).

6. The gas negative pressure valve of claim 4, wherein a linkage rod (15) perpendicular to the diaphragm assembly and is in a middle of the diaphragm assembly; and a lower end of the linkage rod (15) is detachably connected to the first end of the drive lever (5).

7. The gas negative pressure valve of claim 6, wherein the drive lever (5) is a horizontal plate-like structure and an opening groove (16) is disposed at the first end of the drive lever (5); and a positioning groove (17) horizontally fitted into the opening groove (16) is disposed on an outer wall of the lower end of the linkage rod (15).

8. The gas negative pressure valve of claim 6, wherein the diaphragm assembly comprises a circular support plate (18) and an annular elastic diaphragm (19) along a periphery of the support plate (18);

the support plate (18) is of a first rubber material and the elastic diaphragm (19) is of a second rubber material;

the first rubber material is different from the second rubber material; and the linkage rod (15) is on a lower end surface of the support plate (18).

9. The gas negative pressure valve of claim 8, wherein a plate-like first metal embedding piece (20) is disposed in the support plate (18), and a column-like second metal embedding piece (21) is disposed in the linkage rod (15); and the first metal embedding piece (20) and the second metal embedding piece (21) are of one-piece structure.

10. The gas negative pressure valve of claim 7, wherein the diaphragm assembly comprises a circular support plate (18) and an annular elastic diaphragm (19) along a periphery of the support plate (18);

the support plate (18) is of a first rubber material and the elastic diaphragm (19) is of a second rubber material;

the first rubber material is different from the second rubber material; and the linkage rod (15) is on a lower end surface of the support plate (18).

11. The gas negative pressure valve of claim 10, wherein a plate-like first metal embedding piece (20) is disposed in the support plate (18), and a column-like second metal embedding piece (21) is disposed in the linkage rod (15); and the first metal embedding piece (20) and the second metal embedding piece (21) are of one-piece structure.

\* \* \* \* \*